(12) United States Patent
Surnilla et al.

(10) Patent No.: US 9,803,570 B2
(45) Date of Patent: Oct. 31, 2017

(54) SYSTEM AND METHOD FOR CONTROLLING ENGINE AIR FLOW

(71) Applicant: Ford Global Technologies, LLC, Dearborn, MI (US)

(72) Inventors: Gopichandra Surnilla, West Bloomfield, MI (US); Jeffrey Allen Doering, Canton, MI (US); Michael Howard Shelby, Plymouth, MI (US); Stephen B. Smith, Livonia, MI (US); Mohannad Hakeem, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 14/577,378

(22) Filed: Dec. 19, 2014

(65) Prior Publication Data

US 2016/0177849 A1    Jun. 23, 2016

(51) Int. Cl.
*F02D 41/00* (2006.01)
*F02P 5/153* (2006.01)
(Continued)

(52) U.S. Cl.
CPC .......... *F02D 41/0007* (2013.01); *F02B 37/16* (2013.01); *F02D 21/08* (2013.01); *F02D 23/02* (2013.01); *F02P 5/153* (2013.01); *F02D 13/0219* (2013.01); *F02D 2041/001* (2013.01); *F02D 2200/0406* (2013.01);
(Continued)

(58) Field of Classification Search
CPC ...... F02D 41/0007; F02D 21/08; F02D 23/02; F02D 13/0219; F02D 2041/001; F02D 2200/0406; F02D 2200/0418; F02D 2200/0703; F02D 41/0002; F02D 2041/002; F02D 41/24; F02D 41/2409; F02D 41/2412; F02D 41/24125; F02D 41/2425; F02D 41/2429; F02D 41/2451; F02D 41/2461; F02D 41/2464; F02D 41/2467; F02D 41/247; F02D 41/2493; F02D 41/2474; F02D 41/26; F02D 41/263;
(Continued)

(56) References Cited

U.S. PATENT DOCUMENTS 5,357,932 A * 10/1994 Clinton ............... F02D 13/0219
                                              123/478
6,062,204 A *  5/2000 Cullen .................. F02D 41/005
                                              123/406.12

(Continued)

OTHER PUBLICATIONS

Surnilla, Gopichandra et al., "System and Method for Adjusting Engine Airflow," U.S. Appl. No. 14/577,203, filed Dec. 19, 2014, 43 pages.

*Primary Examiner* — Stephen K Cronin
*Assistant Examiner* — Susan Scharpf
(74) *Attorney, Agent, or Firm* — Julia Voutyras; McCoy Russell LLP

(57) ABSTRACT

Methods and systems for operating an engine during conditions where ambient humidity changes over time are presented. In one non-limiting example, an engine air flow limit is adjusted to increase engine air flow during high humidity conditions such that an engine may provide equivalent torque output during the high humidity conditions as compared to when the engine is operated during low humidity conditions.

18 Claims, 5 Drawing Sheets

(51) Int. Cl.
  *F02B 37/16* (2006.01)
  *F02D 21/08* (2006.01)
  *F02D 23/02* (2006.01)
  *F02D 13/02* (2006.01)
(52) U.S. Cl.
  CPC ............... *F02D 2200/0418* (2013.01); *F02D 2200/703* (2013.01); *Y02T 10/144* (2013.01); *Y02T 10/46* (2013.01)
(58) Field of Classification Search
  CPC .............. F02D 41/28; F02D 2041/286; F02D 2041/281; F02D 2041/283; F02B 37/16; F02P 5/153
  USPC ........................................................ 701/103
  See application file for complete search history.

(56) References Cited

U.S. PATENT DOCUMENTS

| | | | |
|---|---|---|---|
| 6,082,343 A * | 7/2000 | Oishi | F01M 13/022 123/572 |
| 6,209,445 B1 * | 4/2001 | Roberts, Jr. | F04B 53/168 92/128 |
| 6,293,778 B1 * | 9/2001 | Joseph | B29C 47/0026 425/140 |
| 6,575,148 B1 * | 6/2003 | Bhargava | F02B 37/18 123/406.19 |
| 6,725,847 B2 * | 4/2004 | Brunemann | F02D 41/005 123/568.12 |
| 6,728,625 B2 * | 4/2004 | Strubhar | F02D 29/06 123/480 |
| 6,918,362 B2 * | 7/2005 | Cullen | F01L 1/022 123/568.22 |
| 6,944,532 B2 * | 9/2005 | Bellinger | B60W 30/1819 123/350 |
| 7,104,228 B2 | 9/2006 | Cullen | |
| 7,246,604 B2 * | 7/2007 | Cullen | F01L 1/34 123/491 |
| 7,597,093 B2 * | 10/2009 | Totten | F02D 41/005 123/406.26 |
| 7,715,976 B1 * | 5/2010 | Xiao | F02D 41/0072 123/406.48 |
| 2007/0051351 A1 | 3/2007 | Pallett et al. | |
| 2008/0022962 A1 * | 1/2008 | Fujiwara | F02F 3/10 123/193.6 |
| 2011/0215088 A1 * | 9/2011 | Muller | F25B 21/00 219/618 |
| 2012/0279200 A1 * | 11/2012 | Nam | F02M 25/0709 60/273 |
| 2013/0019594 A1 * | 1/2013 | Styles | F02M 26/38 60/605.2 |
| 2014/0128222 A1 * | 5/2014 | Norman | F16H 61/0213 477/98 |
| 2015/0096519 A1 * | 4/2015 | Rodriguez | F02D 41/0002 123/184.21 |

* cited by examiner

SYSTEM AND METHOD FOR CONTROLLING ENGINE AIR FLOW

BACKGROUND/SUMMARY

A boosted engine may operate with intake manifold pressures greater than ambient pressure. An engine may be boosted via a turbocharger or a supercharger. The turbocharger's or supercharger's compressor may pressurize ambient air so that engine output may be increased as compared to if the same engine were constrained to operating at ambient pressure. The engine air flow may increase with increased intake manifold pressure provided by the turbocharger or supercharger compressor. However, if the engine is operated during high humidity conditions, engine output may degrade due to the humidity.

The inventors herein have recognized the above-mentioned issues and have developed an engine operating method, comprising: adjusting an engine air flow threshold via a controller responsive to ambient humidity; and operating an engine responsive to the adjusted engine air flow threshold.

By adjusting an engine air flow threshold in response to ambient humidity, it may be possible to provide the technical result of an engine outputting an equivalent torque output during high humidity conditions as the engine outputs during low humidity conditions. For example, during low humidity conditions, the engine may flow a first air flow amount to provide a maximum torque output at a particular speed. A sensor monitoring the engine air flow may indicate the engine has reached its maximum air flow to provide the maximum torque. However, during high humidity conditions, the same sensor may indicate the engine has reached the first air flow amount without the engine providing the same maximum torque at the same particular speed. The engine torque difference arises due to the sensor not compensating for, but being affected by, the increase in ambient humidity. Nevertheless, the engine torque at high humidity conditions may be restored to the engine torque at low humidity conditions via increasing the engine air flow threshold. Increasing the engine air flow threshold during humid operating conditions causes the engine to induct a same amount of oxygen as if the engine were operated at the same conditions but at a lower humidity and a lower engine air flow threshold. In this way, equal amounts of engine torque may be provided during high and low humidity operating conditions.

The present description may provide several advantages. Specifically, the approach may provide more uniform engine performance over a range of ambient humidity levels. Further, the approach is especially suited for turbocharged engines that have capacity to adjust a maximum engine air flow depending on operating conditions. Further still, the approach may be applied to mass air flow systems and speed density systems.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
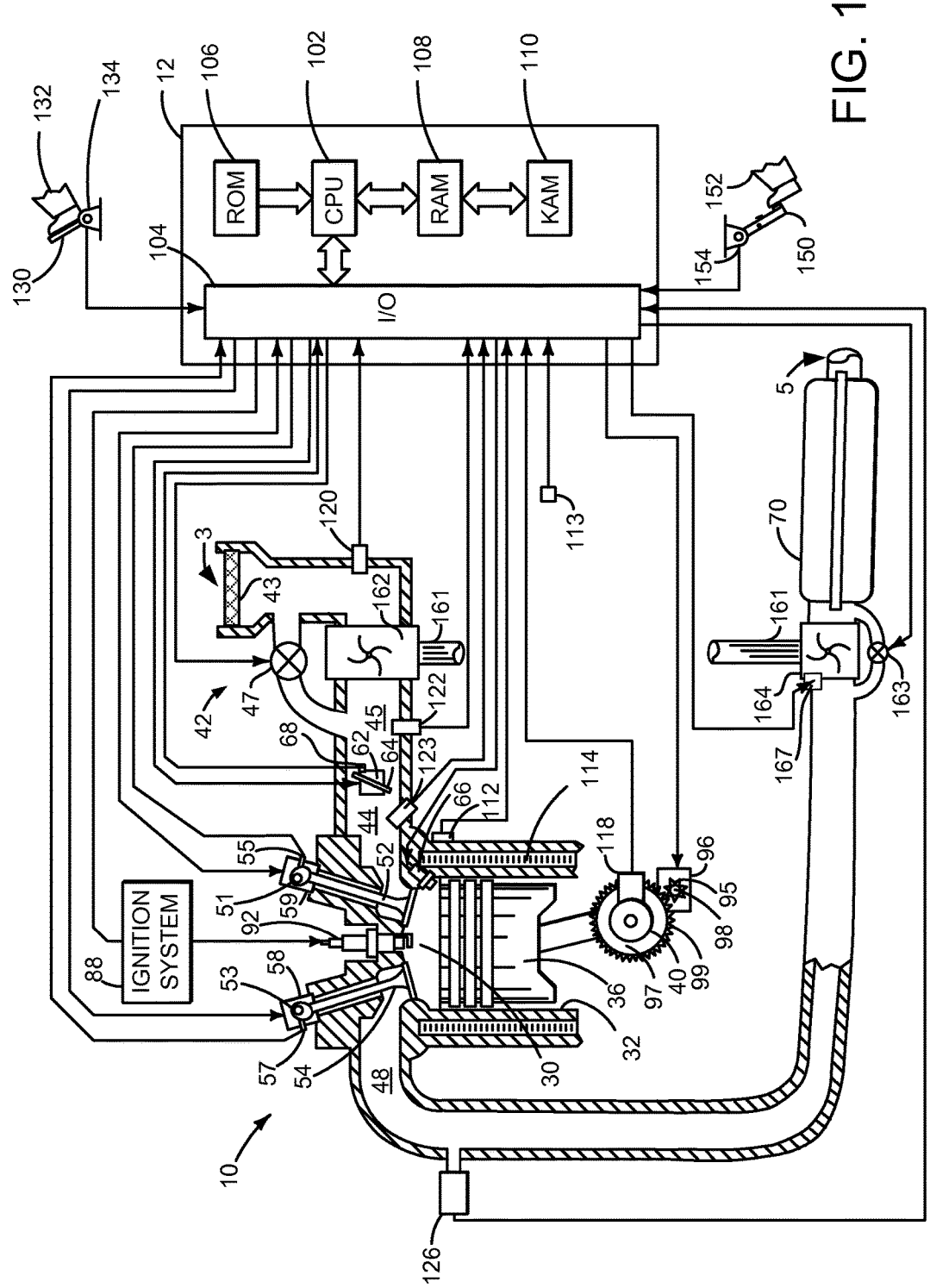
FIG. 1 shows a schematic depiction of an engine.

The present description is related to operating an engine at varying ambient humidity levels. The engine may be configured as is shown in FIG. 1. The engine of FIG. 1 may operate as is described in FIGS. 2-4. The system of FIG. 1 may include executable instructions to provide the engine operating method described in FIG. 5. The engine operating method of FIG. 5 modifies engine operation to equalize engine torque output during low and high ambient humidity conditions. The engine may operate as is shown in the operating sequence of FIG. 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Phase of intake valve 52 with respect to crankshaft 40 may be adjusted via intake camshaft phaser 59. Phase of exhaust valve 54 with respect to crankshaft 40 may be adjusted via exhaust camshaft phaser 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Alternatively, or in addition, vane actuator 167 adjusts a position of turbine vanes to increase or decrease turbine efficiency.

Air filter 43 cleans air entering engine air intake 42 via inlet 3 which is exposed to ambient temperature, pressure, and humidity. Converted combustion byproducts are exhausted at outlet 5 which is exposed to ambient temperature and pressure. Thus, piston 36 and combustion chamber 30 may operate as a pump when engine 10 rotates to draw air from inlet 3 and exhaust combustion byproducts to outlet 5. Inlet 3 is upstream of outlet 5 according to a direction of flow through engine 10, exhaust manifold 48, and engine air intake 42. Upstream does not include anything outside the engine past the inlet 3, and downstream does not include anything outside the engine past the outlet 5.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold absolute pressure (MAP) from pressure sensor 123 coupled to intake manifold 44; a measurement of engine boost pressure or throttle inlet pressure from pressure sensor 122; a measure of ambient humidity from humidity sensor 113; an engine position from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a vehicle system, comprising: an engine including an air flow actuator; a humidity sensor; and a controller including instructions stored in a non-transitory memory for adjusting an engine air flow threshold responsive to ambient humidity determined from the humidity sensor, and instructions for constraining engine air flow to be less than or equal to the engine air flow threshold. The vehicle system further comprises instructions to increase the engine air flow threshold for increasing ambient humidity.

In some examples, the vehicle system includes where the air flow actuator is a turbocharger waste gate and where an opening amount of the turbocharger waste gate is increased responsive to increasing ambient humidity. Alternatively, the waste gate closing amount may be less not be greater than a threshold to limit boost pressure. The vehicle system includes where the air flow actuator is a throttle and where a throttle opening amount is increased responsive to increasing ambient humidity. The vehicle system includes where the engine air flow threshold is a basis for limiting engine boost. The vehicle system further comprises additional instructions to advance spark timing responsive to the engine air flow threshold.

Figure 2:
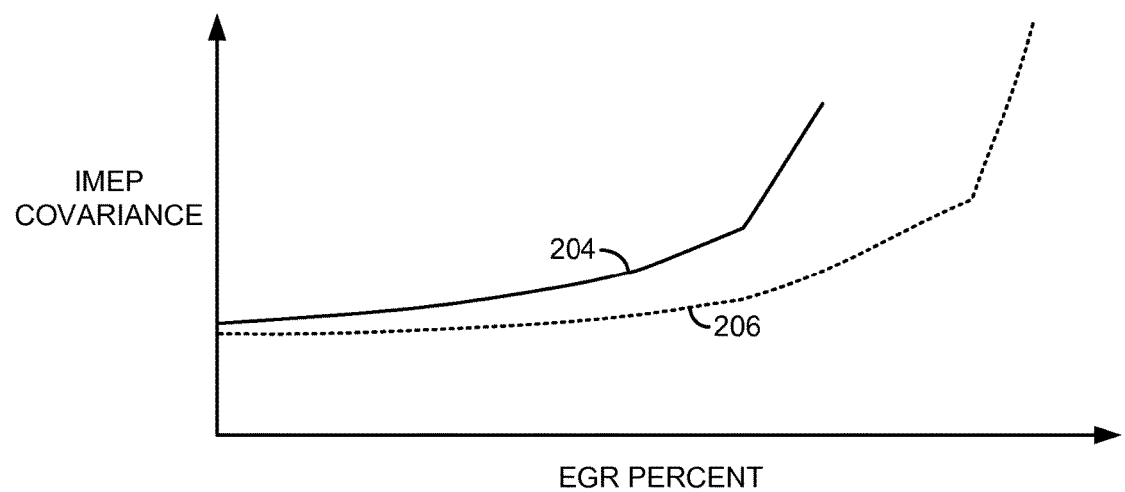
FIGS. 2-4 show example effects of humidity on internal combustion engine operation.

Referring now to FIG. 2, a plot showing variation of indicated mean effective pressure (IMEP) of engine cylinders versus exhaust gas recirculation (EGR) percentage is shown. The vertical axis represents IMEP covariance and IMEP covariance increases in the direction of the vertical axis arrow. The horizontal axis represents EGR percentage of cylinder charge of engine cylinders in percentage. The EGR percentage increases in the direction of the horizontal axis arrow.

Curve 204 represents IMEP covariance versus EGR percentage for an engine operating at a high ambient humidity level. Curve 206 represents IMEP covariance versus EGR percentage for the same engine operating at the same operating conditions, but at a lower ambient humidity level.

As the IMEP covariance increases combustion stability in engine cylinders decreases and the possibility of engine misfire increases.

Thus, it may be observed that increasing humidity decreases combustion stability. This is because the increasing humidity operates to increase cylinder charge dilution. Consequently, it may be desirable to operate the engine with a lower EGR percentage when the engine is operating at higher ambient humidity levels for a given engine speed and load. Similarly, it may be desirable to operate the engine with a high EGR percentage when the engine is operating at lower ambient humidity levels at the same speed and load.

Figure 3:
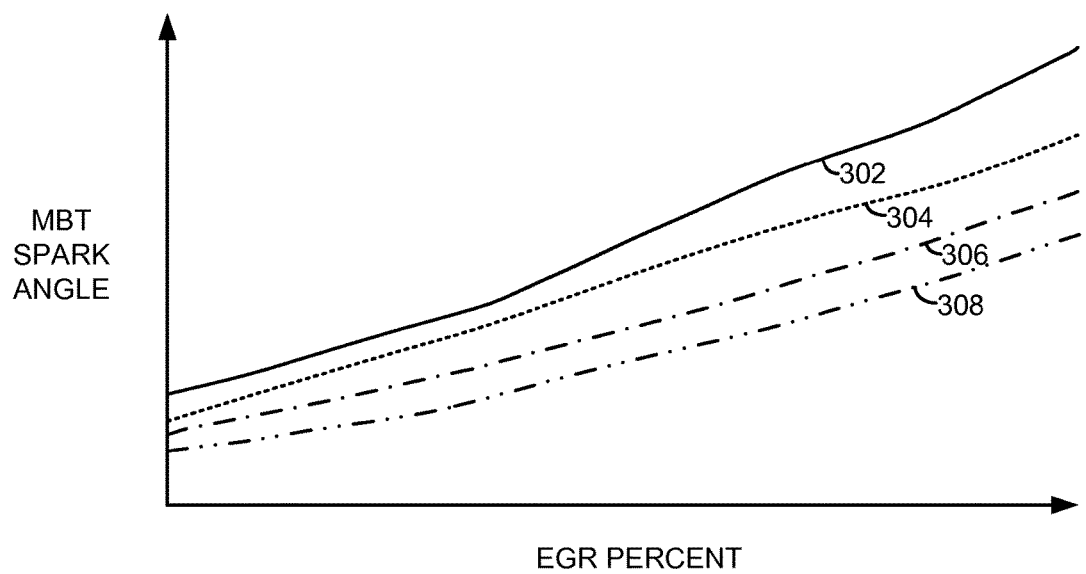

Referring now to FIG. 3, a plot showing minimum spark for best torque (MBT) (e.g., least spark advance for best torque) at a particular engine air flow rate versus exhaust gas recirculation (EGR) percentage is shown. The vertical axis represents MBT spark angle (e.g. crankshaft angle) and MBT spark angle increases in the direction of the vertical axis arrow. In other words, MBT spark timing advances in the direction of the vertical axis arrow. The horizontal axis represents EGR percentage of cylinder charge of engine cylinders in percentage. The EGR percentage increases in the direction of the horizontal axis arrow.

Curve 302 represents MBT spark angle versus EGR percentage for an engine operating at 80 percent relative ambient humidity level. Curve 304 represents MBT spark angle versus EGR percentage for the same engine operating at the same operating conditions and at 60 percent relative ambient humidity level. Curve 306 represents MBT spark angle versus EGR percentage for the same engine operating at the same operating conditions and at 40 percent relative ambient humidity level. Curve 308 represents MBT spark angle versus EGR percentage for the same engine operating at the same operating conditions and at 20 percent relative ambient humidity level.

Thus, it may be observed that increasing humidity increases the advance of MBT spark timing. This is because the increasing humidity operates to increase cylinder charge dilution. Therefore, it may be desirable to operate the engine with more advanced spark timing when the engine is operating at higher ambient humidity levels for a given engine speed and load. Similarly, it may be desirable to operate the engine with less advanced spark timing when the engine is operating at lower ambient humidity levels at the same speed and load. By adjusting MBT spark timing based on ambient humidity, it may be possible for the engine to provide a same amount of torque during high ambient humidity levels as the engine provides during low ambient humidity levels.

Figure 4:
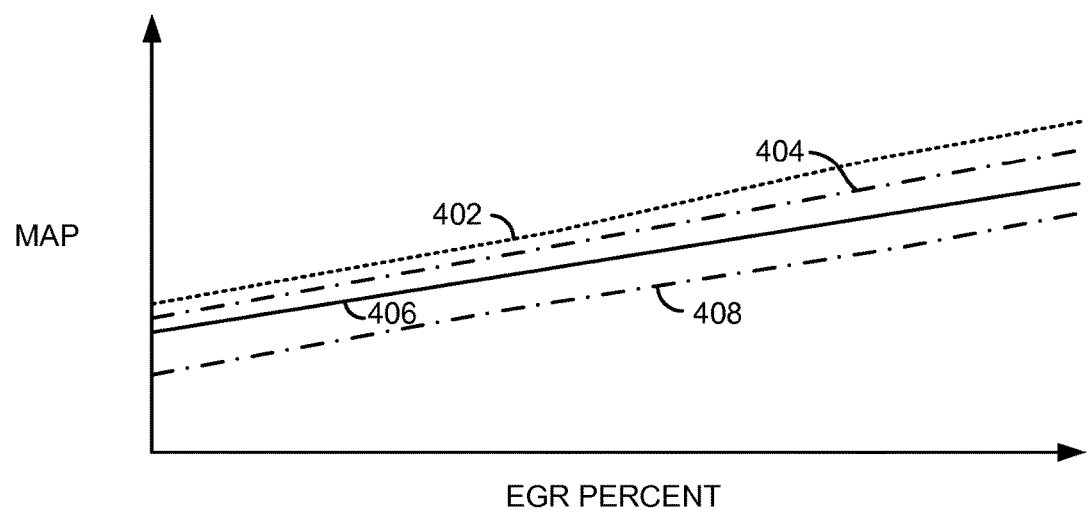

Referring now to FIG. 4, a plot showing intake manifold absolute pressure (MAP) versus exhaust gas recirculation (EGR) percentage for a given engine speed is shown. The vertical axis represents MAP and MAP increases in the direction of the vertical axis arrow. The horizontal axis represents EGR percentage of cylinder charge of engine cylinders in percentage. The EGR percentage increases in the direction of the horizontal axis arrow. The engine is operated to provide equivalent torque at each EGR percentage for the different ambient humidity levels.

Curve 402 represents MAP versus EGR percentage for an engine operating at 80 percent relative ambient humidity level. Curve 404 represents MAP versus EGR percentage for the same engine operating at the same operating conditions and at 60 percent relative ambient humidity level. Curve 406 represents MAP versus EGR percentage for the same engine operating at the same operating conditions and at 40 percent relative ambient humidity level. Curve 408 represents MAP versus EGR percentage for the same engine operating at the same operating conditions and at 20 percent relative ambient humidity level.

Accordingly, it may be observed that MAP has to increase to provide equivalent engine torque for a given engine speed and EGR percentage. This is because the MAP sensor does not compensate for the partial pressure of oxygen in the humid air. MAP may be increased at higher ambient humidity levels to provide the engine with an equivalent amount of oxygen as the engine receives during similar operating condition at lower ambient humidity levels. Therefore, it may be desirable to operate the engine at a higher MAP value when the engine is operating at higher ambient humidity levels for a given engine speed and load to provide a similar engine output torque as is produced by the engine at lower ambient humidity levels.

Figure 5:
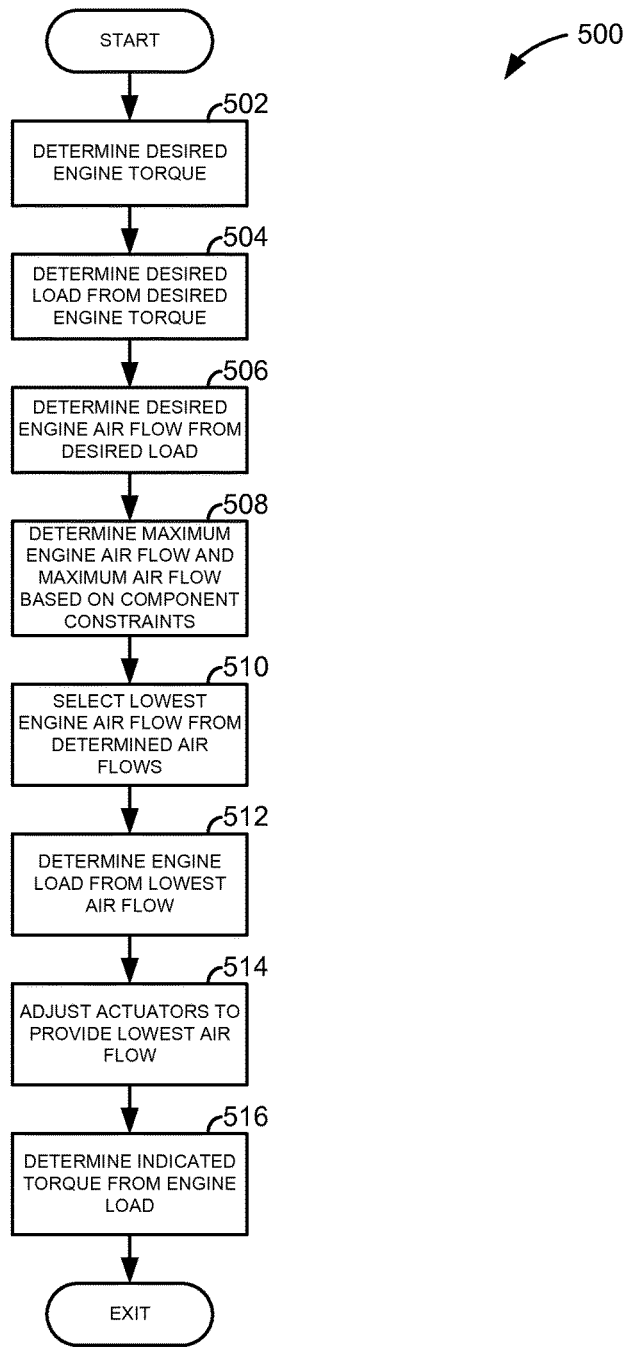
FIG. 5 shows a flowchart of an example method for operating an engine.
Figure 6:
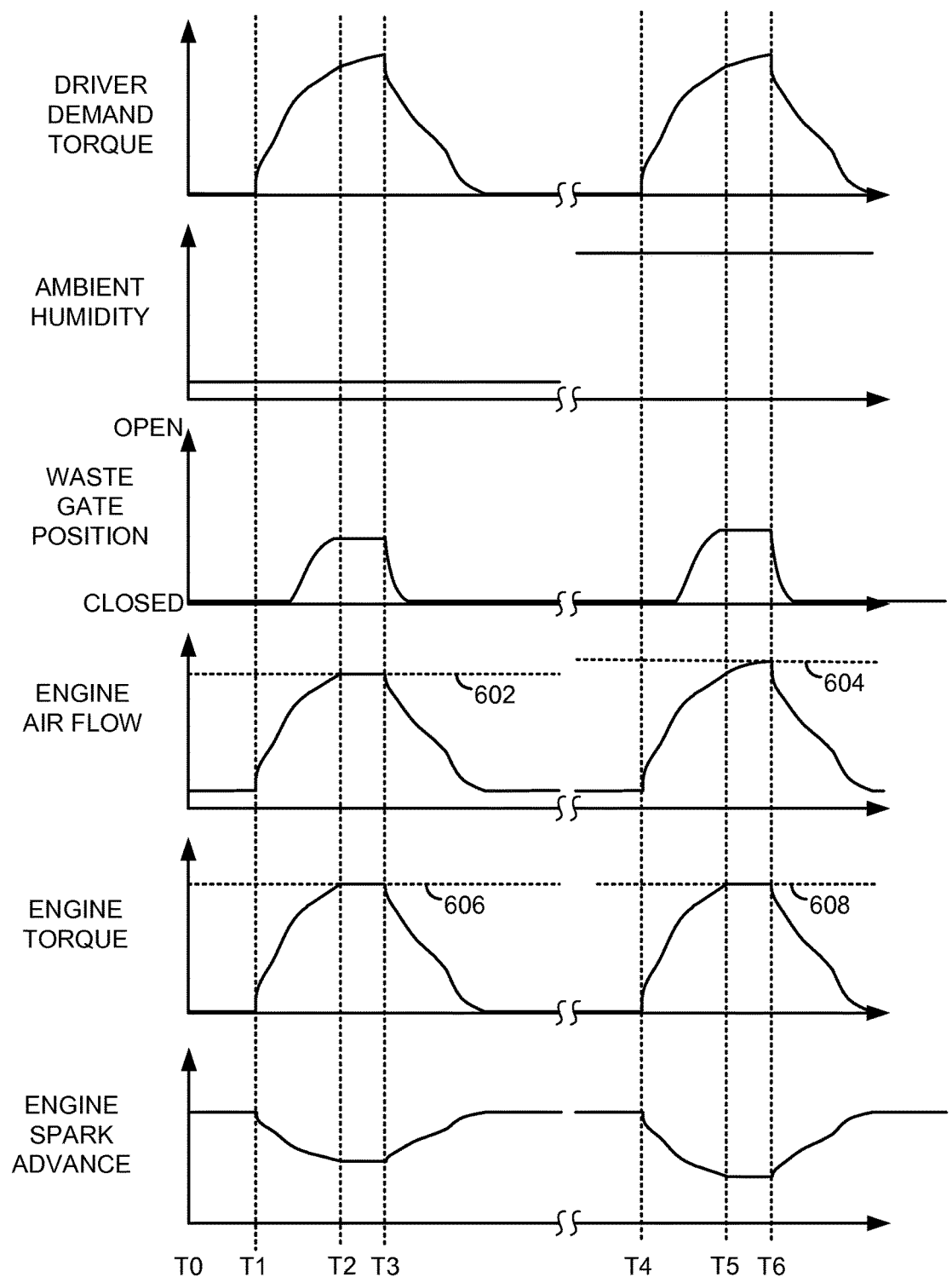
FIG. 6 shows an example engine operating sequence according to the method of FIG. 5.

Referring now to FIG. 5, a method for operating a vehicle driveline is shown. The method of FIG. 5 may be incorporated into the system of FIG. 1 as executable instructions stored in non-transitory memory. Further, the method of FIG. 5 may provide the operating sequence as is shown in FIG. 6.

At 502, method 500 determines a desired engine torque. The desired engine torque may be a sum of driver demand torque, accessory torque, and engine pumping torque. In one example, engine pumping torque may be empirically determined and stored to tables or functions in memory. Accessory torque is torque to operate the vehicle's alternator, air conditioning compressor, power steering pump, and other such devices. The accessory torque may also be empirically determined and stored to memory based on accessory speed and the load being driven. The driver demand torque may be determined based on vehicle speed and accelerator pedal position. Method 500 sums the driver demand torque, accessory torques, and engine pumping torque to provide a desired engine torque and method 500 proceeds to 504.

At 504, method 500 determines a desired engine load from the desired engine torque. The desired engine load may vary from near zero to a value greater than one for a turbocharged or supercharged engine. An engine load value of one for a non-turbocharged engine may represent full engine load at the engine's present speed. The engine load may be determined via a set of empirically determined tables or functions that output an engine load value depending on engine speed, engine valve timing, and engine operating mode (e.g., fuel economy, emissions, engine warming, etc.). In one example, a load value of one represents a maximum theoretical cylinder air charge at the particular speed the engine is operating. Method 500 proceeds to 506 after the engine load value is determined.

At 506, method 500 determines desired engine air mass flow from desired engine load. In one example, the desired engine air flow may be determined by multiplying the desired engine load by the theoretical maximum engine air flow at standard temperature and pressure (e.g., standard atmospheric pressure) multiplied by barometric pressure and ambient temperature adjustments for present engine operating conditions. The theoretical maximum engine air flow at standard temperature and pressure for a four stroke engine is the engine cylinder volume divided by 2, multiplied by the engine speed. The desired engine air mass flow is the desired engine air flow multiplied by the density of air. Method 500 proceeds to 508 after determining the desired engine air mass flow.

At 508, method 500 determines a maximum engine air flow threshold and maximum engine air flow based on component thresholds. In one example, the maximum engine air flow threshold is based on a maximum engine torque determined from a maximum IMEP that is based on piston degradation. The maximum engine air flow threshold may be adjusted for ambient humidity as indicated in the equation:

$$\frac{air\_maf\_max}{1 - (hum\_meas - hum\_base)}$$

where air_maf_max is the maximum engine air flow threshold, hum_meas is the measured humidity, and hum_base is the base humidity in molar percent. The maximum engine air flow threshold may be empirically determined and stored to memory.

Method 500 also determines engine air flow limits or thresholds based on selected engine components. For example, method 500 determines maximum engine air flow or threshold for fuel injectors, turbocharger, and exhaust manifold temperature. Engine air flow limits for fuel injectors, turbocharger, and exhaust manifold temperature may be empirically determined and stored to controller memory. The engine air flow limit for fuel injectors is based on a maximum engine air flow when fuel injectors are flowing at a maximum rate. The engine air flow limit for the turbocharger is the maximum engine air flow when air is flowing through a turbocharger at the turbocharger's maximum air flow. The engine air flow limit for the engine exhaust is the maximum engine air flow that provides engine exhaust temperature less than a threshold temperature. Method 500 proceeds to 510 after maximum engine air flow threshold and engine air flow thresholds based on engine components are determined.

At 510, method selects a lowest value from the desired engine air flow determined at 506, the maximum engine air flow threshold determined at 508, and the engine air flow thresholds based on engine components determined at 508. Thus, if the desired engine air flow determined at 506 is 200 g/min, the maximum engine air flow threshold is 230 g/min, the maximum engine air flow for fuel injectors is 245 g/min, the maximum engine air flow for the turbocharger is 235 g/min, and the maximum engine air flow for engine exhaust temperature is 233 g/min, method 500 selects 200 g/min as the lowest engine air flow. On the other hand, if the desired engine air flow determined at 506 is 250 g/min, the maximum engine air flow threshold is 230 g/min, the maximum engine air flow for fuel injectors is 245 g/min, the maximum engine air flow for the turbocharger is 235 g/min, and the maximum engine air flow for engine exhaust temperature is 233 g/min, method 500 selects 230 g/min as the lowest engine air flow. In this way, the maximum engine air flow threshold and the engine air flow thresholds based on engine components may prevent the selected engine air flow from exceeding the maximum engine air flow threshold and the engine air flow thresholds based on engine components. Method 500 proceeds to 512 after the lowest engine air flow value is determined.

At 512, method 500 determines engine load from the lowest engine air flow value determined at 510. In one example, the tables and/or functions at 506 are inverted so that the lowest engine air flow from 510 is the basis for indexing the tables and/or functions. The tables and/or functions output engine load. Method 500 proceeds to 514 after engine load is determined.

At 514, method 500 adjusts engine actuators to provide the lowest engine air flow determined at 510. In one example, method 500 prevents a throttle opening amount, camshaft advance relative to crankshaft position, boost pressure, and/or waste gate closing amount from exceeding threshold amounts so that the lowest engine air flow is not exceeded. Thus, each of throttle opening amount, camshaft advance, boost pressure and waste gate closing amount may not exceed threshold values so that the lowest engine air flow is not exceeded. Method 500 proceeds to 516 after operation of engine actuators is limited.

At 516, method 500 determines engine indicated torque from the engine load determined at 512. In one example, the tables and/or functions at 504 are inverted so that the engine load from 512 is the basis for index tables and/or functions. The tables and/or functions output engine load. Because engine load and engine indicated torque are based on the lowest torque determined at 510, the engine load and indicated torque are maintained below a threshold engine load and threshold indicated torque. Method 500 proceeds to exit after engine load is determined.

In this way, the maximum engine air flow threshold may be adjusted responsive to humidity. For example, the maximum engine air flow may be increased for higher ambient humidity levels so that an equivalent amount of oxygen is supplied to the engine during the same operating conditions, except for the engine operating at a lower ambient humidity level.

The method of FIG. 5 provides for an engine operating method, comprising: adjusting an engine air flow threshold via a controller responsive to ambient humidity; and operating an engine responsive to the adjusted engine air flow threshold. The engine may be operated responsive to the adjusted engine air flow threshold via adjusting spark, fuel, and EGR flow rate responsive to the adjusted engine air flow threshold. The method includes where the engine air flow threshold is a maximum engine air flow threshold. The method further comprises adjusting engine torque responsive to the engine air flow threshold.

In some examples, the method includes where engine torque is limited responsive to the engine air flow threshold, where limited includes holding engine torque to less than a threshold torque. The method includes where the ambient humidity is based on output of a humidity sensor. The method includes where the engine air flow threshold is a basis for adjusting engine air flow. The method includes where engine air flow is adjusted to a value equal to the engine air flow threshold during conditions when driver demand torque is greater than a threshold torque.

The method of FIG. 5 also provides for an engine operating method, comprising: adjusting an engine air flow threshold via a controller responsive to ambient humidity; and adjusting an actuator responsive to the engine air flow threshold. The method includes where the actuator is a camshaft phaser. The method includes where the actuator is a throttle. The method includes where the actuator is a turbocharger waste gate actuator. The method includes where the actuator is a turbocharger vane actuator. The method further comprises adjusting the actuator to hold engine air flow to equal the engine air flow threshold in response to a torque request greater than a threshold. The method includes where the engine air flow threshold is a maximum engine air flow.

Referring now to FIG. 6, an example simulated engine operating sequence is shown. The signals and sequences of FIG. 6 may be provided by the system shown in FIG. 1 executing the method of FIG. 5. Vertical markers T0-T6 represent times of interest in the sequence. In this example, the engine is shown operating at different ambient humidity levels according to the method of FIG. 5. The first portion of the engine operating sequence occurs between times T0 and T3. It represents engine operation during low ambient humidity conditions. The second portion of the engine operating sequence occurs between times T4 and T6. It represents engine operation during high ambient humidity conditions. The double S along the horizontal axis of each plot represents a brake in time. The time interval may be long or short between the double S time brake.

The first plot from the top of FIG. 6 represents driver demand torque versus time. The horizontal axis represents time and time increases from the left side of the plot to the right side of the plot. The vertical axis represents driver demand torque and driver demand torque increases in the direction of the vertical axis arrow. Driver demand torque may be determined from accelerator pedal position and vehicle speed.

The second plot from the top of FIG. 6 represents ambient humidity level speed versus time. The vertical axis represents ambient humidity level and ambient humidity level increases in the direction of the vertical axis arrow. The horizontal axis represents time and time increases from the left side of the plot to the right side of the plot.

The third plot from the top of FIG. 6 represents turbocharger waste gate position versus time. The vertical axis represents waste gate position and waste gate position opening amount increases in the direction of the vertical axis arrow. The horizontal axis represents time and time increases from the left to the right side of the figure.

The fourth plot from the top of FIG. 6 represents engine air flow amount versus time. The vertical axis represents engine air flow amount and engine air flow amount increases in the direction of the vertical axis arrow. The horizontal axis represents time and time increases from the left to the right side of the figure. Horizontal line 602 represents a maximum engine air flow threshold for low ambient humidity conditions at the present engine operating conditions. Horizontal line 604 represents a maximum engine air flow threshold for high ambient humidity conditions at the present engine operating conditions, the same operating conditions as for horizontal line 602, except higher ambient humidity.

The fifth plot from the top of FIG. 6 represents engine indicated torque versus time. The vertical axis represents engine indicated torque application engine indicated torque increases in the direction of the vertical axis arrow. The horizontal axis represents time and time increases from the left to the right side of the figure. Horizontal line 606 represents a maximum engine indicated torque threshold for low ambient humidity conditions at the present engine operating conditions. Horizontal line 608 represents a maximum engine indicated torque threshold for high ambient humidity conditions at the present engine operating conditions, the same operating conditions as for horizontal line 606, except higher ambient humidity.

The sixth plot from the top of FIG. 6 represents engine spark advance versus time. The vertical axis represents engine spark advance and engine spark advance increases in the direction of the vertical axis arrow. The horizontal axis represents time and time increases from the left to the right side of the figure.

At time T0, the driver demand torque is at a lower level and the ambient humidity level is low. At lower ambient humidity levels, MAP and MAF sensor outputs are less affected by humidity. The waste gate position is closed and the engine air flow is low. Such conditions may be indicative of idle conditions. Additionally, engine indicated torque is low and spark timing is advanced.

At time T1, a driver increases the driver demand torque and the engine air flow begins to increase in response to the increased driver demand torque. The ambient humidity level remains low and the waste gate remains closed as the engine begins to accelerate (not shown). The engine indicated torque increases in response to the increased driver demand torque and engine air flow. The spark advance is retarded as driver demand torque increases and engine speed increases (not shown).

Between time T1 and time T2, the driver demand torque continues to increase and the engine air flow and indicated torque increase with the increasing driver demand torque. The waste gate begins to open as engine speed increases and thermal energy supplied to the turbocharger increases (not shown). The engine spark timing is further retarded.

At time T2, the engine air flow is held or limited to the value of threshold 602 to reduce the possibility of engine degradation even though the driver demand torque continues to increase. The engine air flow may be limited to a maximum engine air flow as is described at 508 of FIG. 5. The engine air flow may be limited to the maximum engine air flow via limiting waste gate opening as is shown a time T2. Further, the engine throttle opening amount and cam advance may be limited or constrained to values that prevent engine air flow from exceeding threshold 602. By constraining engine air flow to less than a threshold, engine torque may be constrained to threshold 606. Spark timing is held constant as engine air flow is held to less than or equal to threshold 602.

Between time T2 and time T3, the driver demand torque continues to increase, but engine air flow, engine spark, and indicated engine torque remain unchanged. The ambient humidity level also remains at a constant low value.

At time T3, the driver releases the accelerator pedal (not shown) and the driver demand torque begins to decline. The engine air flow and indicated engine torque begin to be reduced shortly after the driver demand torque is reduced to less than a torque that requests air flow greater than level 602. The waste gate opening amount also decreases in response to the reduced driver demand torque. The spark advance increases in response to the decrease in driver demand torque.

The second part of the sequence starts just before time T4 where the engine is operated under the same operating conditions as at time T0, except the ambient humidity level has increased.

At time T4, a driver increases the driver demand torque and the engine air flow begins to increase in response to the increased driver demand torque the same as at time T1. The ambient humidity level remains high and the waste gate remains closed as the engine begins to accelerate (not shown). The engine indicated torque increases in response to the increased driver demand torque and engine air flow. The spark advance is retarded as driver demand torque increases and engine speed increases (not shown). In some examples, the spark advance at time T4 may be further advanced than the spark timing at time T1 to compensate for the dilution provided by the higher ambient humidity.

Between time T4 and time T5, the driver demand torque continues to increase and the engine air flow and indicated torque increase with the increasing driver demand torque the same as between time T1 and time T2. The waste gate begins to open as engine speed increases and thermal energy supplied to the turbocharger increases (not shown). The engine spark timing is further retarded.

At time T5, the engine air flow continues to rise because the engine air flow threshold has been increased to the value of threshold 604. The engine air flow threshold may be increased during higher ambient humidity conditions so that the engine is supplied a same amount of oxygen as when the engine is operated at the same conditions, except at a lower ambient humidity level. The engine air flow may be limited to a maximum engine air flow threshold as is described at 508 of FIG. 5. The engine air flow may be limited to the maximum engine air flow threshold via limiting waste gate opening as is shown a time T5. Additionally, the engine throttle opening amount and cam advance may be limited or constrained to values that prevent engine air flow from exceeding threshold 604. By constraining engine air flow to less than a threshold, engine torque may be constrained to threshold 608, which is the same as threshold 606. Thus, engine air flow may be increased to compensate for MAP or MAF sensor outputs which may not adjust for ambient humidity. Spark timing is held constant as engine air flow is held to less than or equal to threshold 604.

Between time T5 and time T6, the driver demand torque continues to increase along with the engine air flow. If the indicated engine torque is adjusted for ambient humidity, the engine spark and indicated engine torque will change with increasing engine air flow. The ambient humidity level also remains at a constant high value.

At time T6, the driver releases the accelerator pedal (not shown) and the driver demand torque begins to decline. The engine air flow and indicated engine torque begin to be reduced as the driver demand torque is reduced. The waste gate opening amount also decreases in response to the reduced driver demand torque. The spark advance increases in response to the decrease in driver demand torque.

In this way, if the engine is operated at higher ambient humidity levels, the engine air flow threshold may be increased so that an amount of oxygen supplied to the engine at high engine load remains constant. Accordingly, the engine may provide same maximum torque output at the same operating conditions, including high and low humidity conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine operating method, comprising:
adjusting an engine air flow threshold via a controller responsive to ambient humidity, where the engine air flow threshold is a maximum engine air flow threshold, and where the engine air flow threshold is a basis for adjusting engine air flow;
providing a constant engine spark timing when an engine is operated with engine air flow at the engine air flow threshold; and
operating the engine responsive to the adjusted engine air flow threshold via the controller.

2. The method of claim 1, where the engine air flow threshold is determined from an indicated mean effective pressure.

3. The method of claim 2, where the indicated mean effective pressure is determined based on piston degradation, and further comprising:
adjusting engine torque responsive to the engine air flow threshold.

4. The method of claim 3, where engine torque is limited responsive to the engine air flow threshold.

5. The method of claim 1, where the ambient humidity is based on output of a humidity sensor, and further comprising:
selecting a lowest value from a group comprising the engine air flow threshold, a desired engine air flow, a turbocharger maximum air flow, and a maximum engine air flow when fuel injectors are providing flow at a maximum rate, and operating the engine in further response to the selected lowest value.

6. The method of claim 1, further comprising adjusting the engine air flow to a value equal to the engine air flow threshold during conditions when driver demand torque is greater than a threshold torque.

7. An engine operating method, comprising:
adjusting an engine air flow threshold via a controller responsive to ambient humidity;
selecting a lowest value from a group comprising the engine air flow threshold, a desired engine air flow, a turbocharger maximum air flow, and a maximum engine air flow when fuel injectors are providing flow at a maximum rate via the controller; and
adjusting an actuator via the controller responsive to the lowest value.

8. The method of claim 7, where the actuator is a camshaft phaser, and where the engine air flow threshold is determined from piston degradation.

9. The method of claim 7, where the actuator is a throttle.

10. The method of claim 7, where the actuator is a turbocharger waste gate actuator.

11. The method of claim 7, where the actuator is a turbocharger vane actuator.

12. The method of claim 7, further comprising adjusting the actuator to hold engine air flow to the engine air flow threshold in response to a torque request greater than a threshold.

13. The method of claim 7, where the engine air flow threshold is determined from an indicated mean effective pressure.

14. A vehicle system, comprising:
an engine including an air flow actuator;
a humidity sensor; and a controller including instructions stored in a non-transitory memory for adjusting an engine air flow threshold responsive to ambient humidity determined from the humidity sensor, and instructions for constraining engine air flow to be less than or equal to the engine air flow threshold, the engine air flow threshold determined from an indicated mean effective pressure, where the indicated mean effective pressure is a maximum indicated mean effective pressure based on piston degradation, and where the engine air flow threshold is adjusted via dividing the engine air flow threshold by a value of one minus a value of a measured humidity minus a base humidity, and additional instructions to increase the engine air flow threshold for increasing ambient humidity.

15. The vehicle system of claim 14, where the air flow actuator is a turbocharger waste gate and where an opening amount of the turbocharger waste gate is increased responsive to increasing ambient humidity.

16. The vehicle system of claim 14, where the air flow actuator is a throttle and where a throttle opening amount is increased responsive to increasing ambient humidity, and further comprising:

selecting a lowest value from a group comprising the engine air flow threshold, a desired engine air flow, a turbocharger maximum air flow, and a maximum engine air flow when fuel injectors are providing flow at a maximum rate via the controller, and operating the engine in further response to the selected lowest value via the controller.

17. The vehicle system of claim 14, where the engine air flow threshold is a basis for limiting engine boost.

18. The vehicle system of claim 17, further comprising additional instructions to advance spark timing responsive to the engine air flow threshold.

* * * * *